United States Patent
Kikuchi et al.

(10) Patent No.: US 11,300,423 B2
(45) Date of Patent: Apr. 12, 2022

(54) COMMUNICATION MANAGEMENT SYSTEM FOR SURVEYING INSTRUMENT

(71) Applicant: TOPCON CORPORATION, Tokyo (JP)

(72) Inventors: Takeshi Kikuchi, Tokyo (JP); Mitsutaka Kagata, Tokyo (JP); Sora Otaguro, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 237 days.

(21) Appl. No.: 16/612,977

(22) PCT Filed: Jun. 25, 2018

(86) PCT No.: PCT/JP2018/023977
§ 371 (c)(1),
(2) Date: Nov. 12, 2019

(87) PCT Pub. No.: WO2019/009119
PCT Pub. Date: Jan. 10, 2019

(65) Prior Publication Data
US 2020/0200564 A1    Jun. 25, 2020

(30) Foreign Application Priority Data
Jul. 7, 2017    (JP) .............................. JP2017-134131

(51) Int. Cl.
*G06Q 10/00* (2012.01)
*G06Q 20/06* (2012.01)
(Continued)

(52) U.S. Cl.
CPC .............. *G01C 25/00* (2013.01); *G01C 3/04* (2013.01); *G06Q 10/20* (2013.01); *G06Q 20/065* (2013.01); *G06Q 20/105* (2013.01)

(58) Field of Classification Search
CPC .... G06Q 10/20; G06Q 20/065; G06Q 20/105; G01C 25/00; G01C 15/002; G01C 3/04
(Continued)

(56) References Cited

U.S. PATENT DOCUMENTS

2006/0016085 A1    1/2006    Imamura et al.
2012/0133918 A1    5/2012    Sakimura et al.
(Continued)

FOREIGN PATENT DOCUMENTS

JP    2002-163387 A    6/2002
JP    2004-227249 A    8/2004
(Continued)

OTHER PUBLICATIONS

English Translation of JP2016223904 (Year: 2016).*
International Search Report issued in corresponding PCT Application No. PCT/JP2018/023977 dated Sep. 25, 2018.

*Primary Examiner* — John H Le
(74) *Attorney, Agent, or Firm* — Roberts Calderon Safran & Cole P.C.

(57) ABSTRACT

Provided is a communication management system for a surveying instrument. The system includes: a surveying instrument including a survey unit configured to survey a target, a control unit configured to control the survey unit, and a communication unit connected to a communication network; a management server capable of communicating with the surveying instrument; and a remote terminal capable of communicating with the management server, wherein the remote terminal makes maintenance settings for the surveying instrument and cancels the maintenance settings, and stores the maintenance settings and cancellation of the settings in the management server, the management server gives a notification to at least one of a user and an administrator that the surveying instrument is in a state requiring predetermined maintenance work according to the
(Continued)

maintenance settings, and when the maintenance settings are canceled, stops the notification.

4 Claims, 8 Drawing Sheets

(51) Int. Cl.
*G06Q 20/10* (2012.01)
*G01C 25/00* (2006.01)
*G01C 3/04* (2006.01)

(58) Field of Classification Search
USPC .......................................................... 702/159
See application file for complete search history.

(56) References Cited

U.S. PATENT DOCUMENTS

| | | | |
|---|---|---|---|
| 2016/0252348 A1* | 9/2016 | Momiyama | G01C 5/06 342/357.34 |
| 2016/0325391 A1 | 11/2016 | Stampfl et al. | |
| 2017/0046934 A1 | 2/2017 | Mondal et al. | |

FOREIGN PATENT DOCUMENTS

| | | | |
|---|---|---|---|
| JP | 2007-170978 A | 7/2007 |
| JP | 2009-139386 A | 6/2009 |
| JP | 2012-117874 A | 6/2012 |
| JP | 2016-223904 A | 12/2016 |

\* cited by examiner

COMMUNICATION MANAGEMENT SYSTEM FOR SURVEYING INSTRUMENT

CROSS-REFERENCE TO RELATED APPLICATIONS

The present application is a U.S. National Phase of PCT/JP2018/023977 filed on June 25, 2018 claiming priority to Japanese Patent Application No. 2017-134131 filed on July 7, 2017. The disclosure of the PCT Application is hereby incorporated by reference into the present Application.

TECHNICAL FIELD

The present invention relates to a communication management system that performs maintenance management for a surveying instrument.

BACKGROUND ART

A surveying instrument (total station) surveys by irradiating distance-measuring light onto a target placed at a measurement point, and receiving light reflected from the target. For a survey, measurement accuracy according to a purpose is required, so that it is important to maintain accuracy of a surveying instrument. Therefore, the instrument is required to be always kept in a good state by receiving maintenance periodically or as necessary.

Patent Literature 1 discloses techniques related to maintenance management for a surveying instrument, in which by using a management program, from information based on maintenance records, a notification that a time for maintenance has arrived is displayed on a display, preparation for periodic maintenance is made, and according to the circumstances, upon checking an error status, necessity of maintenance is transmitted to the surveying instrument through the Internet.

However, in actuality, if the information is simply displayed on the surveying instrument or the notification is transmitted once, and does not attract the user's attention, the instrument is often used without being inspected. Therefore, there was a problem in which accuracy of the instrument could not be maintained.

CITATION LIST

Patent Literature

[Patent Literature 1] Japanese Published Unexamined Patent Application Publication No. 2007-170978

SUMMARY OF THE INVENTION

Technical Problem

The present invention was made in view of the above-described circumstances, and an object thereof is to provide a communication management system of a surveying instrument, capable of preventing a surveying instrument from being continuously used without maintenance.

Solution to Problem

In order to solve the above-described problem, a communication management system for a surveying instrument according to an aspect of the present invention includes: a surveying instrument including a survey unit configured to survey a target, a control unit configured to control the survey unit, and a communication unit connected to a communication network; a management server capable of communicating with the surveying instrument through the communication network; and a remote terminal capable of communicating with the management server through the communication network, wherein the remote terminal is configured to make maintenance settings for the surveying instrument and cancel the maintenance settings, and store the maintenance settings and cancellation of the settings in the management server, the management server is configured to give a notification to at least one of a user and an administrator of the surveying instrument that the surveying instrument is in a state requiring predetermined maintenance work according to the maintenance settings, and when the maintenance settings are canceled, stop the notification, the maintenance settings include settings associated with a maintenance period, and the notification includes a prior notification to be given before a maintenance date arrives.

In the aspect described above, it is also preferable that the management server is configured to set the surveying instrument into an unusable state until the maintenance settings are canceled.

In the aspect described above, it is also preferable that, in order to perform at least one of making maintenance settings for the surveying instrument and cancellation of the maintenance settings, one unit of virtual currency generated in advance for payment related to communication management of the surveying instrument is consumed.

Effect of Invention

According to the communication management system of the present invention, a surveying instrument can be prevented from being continuously used without maintenance.

DESCRIPTION OF EMBODIMENTS

Hereinafter, preferred embodiments of the present invention will be described with reference to the drawings.

In this description, an administrator of a surveying instrument TS means a surveying instrument manufacturer, agent, or management company, or a person who belongs to these and administers the surveying instrument TS. A user of a surveying instrument means an owner of the surveying instrument or a person, etc., who belongs to a company, etc., of the owner and routinely uses the surveying instrument.

First Embodiment (Entire Configuration of Communication Management System)

Figure 1:
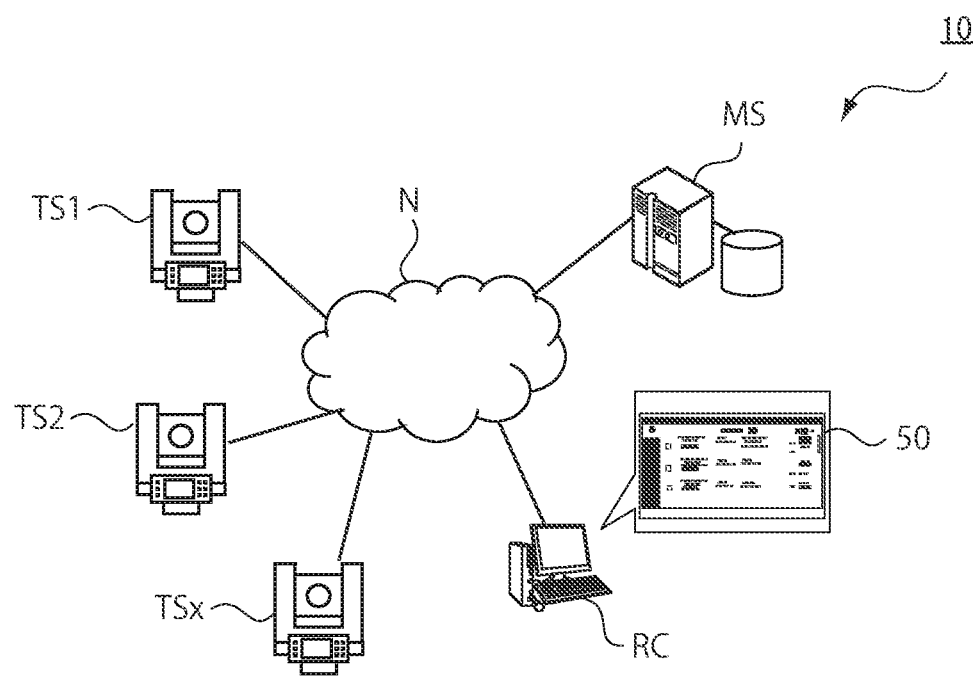
FIG. 1 is a view illustrating an entire configuration of a communication management system according to a first embodiment of the present invention.

FIG. 1 is a view illustrating an entire configuration of a communication management system 10 according to a first embodiment of the present invention. As illustrated in FIG. 1, the communication management system 10 includes a plurality of surveying instruments TS1, TS2 . . . , TSx (hereinafter, TS is used as a representative sign) as management targets, a management server MS, and a remote terminal RC. The surveying instruments TS, the management server MS, and the remote terminal RC can communicate with each other through a communication network N. The communication network N may include an arbitrary communication network including the Internet, a local area network such as an internal LAN, a connection cable, and a satellite communication network, etc.

(Configuration of Surveying Instrument)

Figure 2:
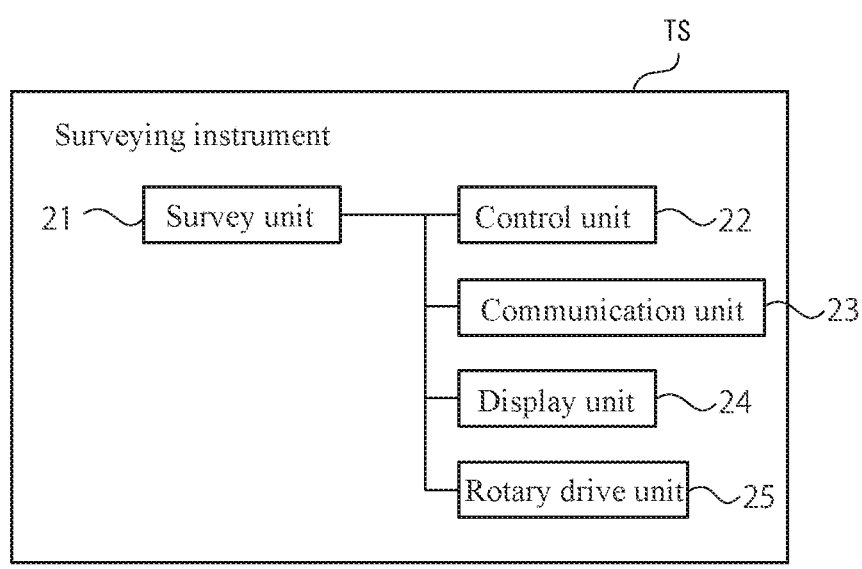
FIG. 2 is a configuration block diagram of a surveying instrument according to the same embodiment.

FIG. 2 is a configuration block diagram of a surveying instrument TS according to the embodiment. The surveying instrument TS is a total station (electronic distance and angle measuring instrument). As illustrated in FIG. 2, the surveying instrument TS includes a survey unit 21, a control unit 22, a communication unit 23, a display unit 24, and a rotary drive unit 25. The surveying instrument may be configured so that the communication unit 23 is retrofitted (externally fitted) to the surveying instrument TS.

The survey unit 21 includes a light emitting element, a distance-measuring optical system, and a light receiving element disposed inside a telescope (not illustrated) of the surveying instrument TS. The survey unit 21 makes a distance measurement by irradiating a target by emitting distance-measuring light from the light emitting element via the distance-measuring optical system, and receiving reflected light from the target by the light receiving element. The survey unit 21 makes an angle measurement by measuring a vertical rotation angle of the telescope and a horizontal rotation angle of a housing (not illustrated) of the telescope by rotary encoders.

The communication unit 23 enables communication with the outside through the communication network N, and is connected to, for example, the Internet by using an Internet protocol (TCP/IP).

The display unit 24 has a liquid crystal screen, and the display unit 24 is configured such that survey conditions, etc., can be input therein, and various information on a survey are displayed thereon. The rotary drive unit 25 is a motor, including a motor to vertically rotate the telescope and a motor to horizontally rotate the housing.

The control unit 22 is a control unit including at least a CPU and a memory (ROM, RAM, etc.). The control unit 22 executes a survey application program and makes the display unit 24 display a screen according to the application. The control unit 22 drives the survey unit 21 and the rotary drive unit 25, performs automatic collimation and measures a distance and an angle to a target to acquire survey data of a measurement point. The control unit 22 transmits and receives information to and from the management server MS through the communication network N by using the communication unit 23, and executes a command from the management server MS. Further, the control unit 22 confirms the state with the management server MS at a constant cycle, for example, once a day. That is, the control unit confirms whether there is a notification to be displayed by the surveying instrument TS on the management server MS. The control unit 22 downloads a message stored in the management server MS based on maintenance settings stored in the management server MS, and makes the display unit 24 display the message.

(Configuration of Remote Terminal)

Figure 3:
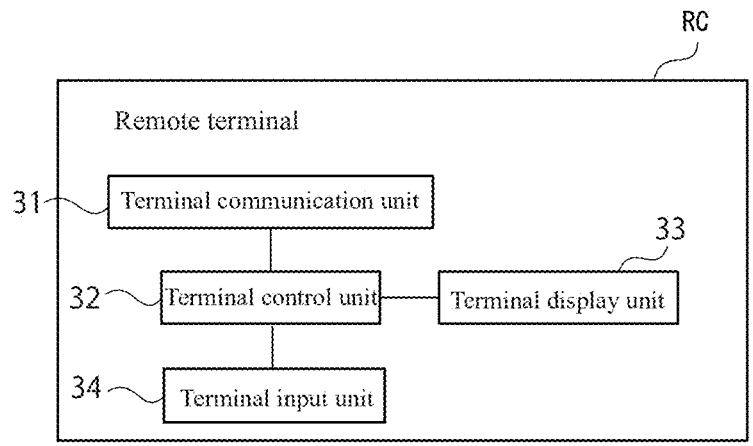
FIG. 3 is a configuration block diagram of a remote terminal according to the same embodiment.

FIG. 3 is a configuration block diagram of the remote terminal RC according to the present embodiment. The remote terminal RC is a terminal, for example, a personal computer, a smartphone, a tablet, etc., owned by a surveying instrument manufacturer or agent. The remote terminal RC includes at least a terminal communication unit 31, a terminal control unit 32, a terminal display unit 33, and a terminal input unit 34 as illustrated in FIG. 3.

The terminal communication unit 31 can transmit and receive information to and from a server communication unit 41 of the management server MS described below through the communication network N.

The terminal control unit 32 is a control unit including at least a CPU and a memory (ROM, RAM, etc.). The terminal control unit 32 makes maintenance settings for the surveying instrument TS as a setting target. In addition, when predetermined maintenance work is completed, the terminal control unit 32 cancels the maintenance settings.

The terminal display unit 33 displays an operation screen for an administrator based on a command from the terminal control unit 32, and is, for example, a liquid crystal display, etc.

The terminal input unit 34 is an input device, for example, a keyboard, a numeric keypad, or a touch panel, etc., and inputs information necessary for operation of the remote terminal RC.

(Configuration of Management Server)

Figure 4:
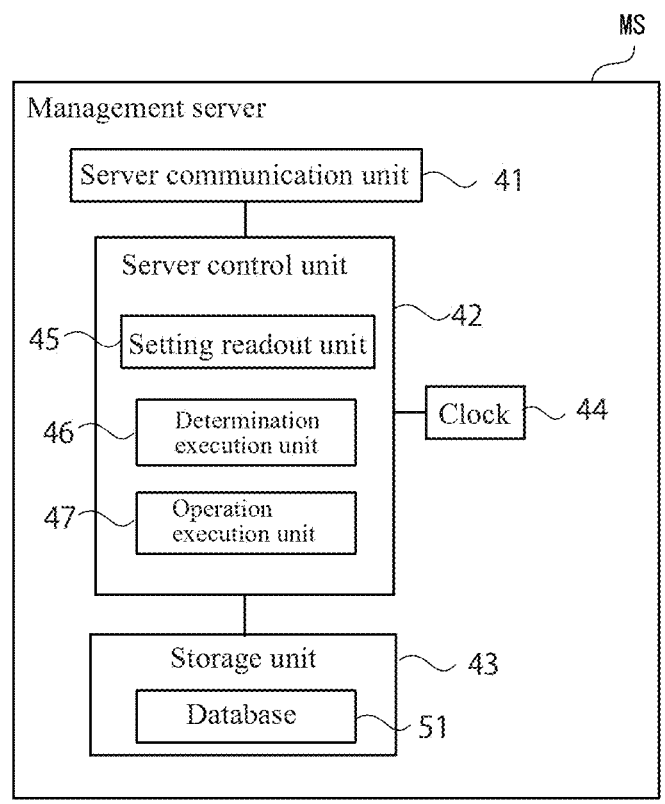
FIG. 4 is a configuration block diagram of a management server according to the same embodiment.

FIG. 4 is a configuration block diagram of the management server MS according to the present embodiment. The management server MS includes at least a server communication unit 41, a server control unit 42, a storage unit database 51, and a clock 44.

The server communication unit 41 can transmit and receive information to and from the communication unit 23 of the surveying instrument TS and the terminal communication unit 31 of the remote terminal RC through the communication network N.

The storage unit 43 includes at least a database 51, and the database 51 stores information received from the surveying instrument TS and the remote terminal RC in association with a management number of the surveying instrument TS.

The server control unit 42 is a control unit including at least a CPU and a memory (ROM, RAM, etc.). The server control unit 42 includes, as illustrated in FIG. 4, a setting readout unit 44, a determination execution unit 46, and an operation execution unit 47.

The setting readout unit 44 reads out maintenance settings stored in the database 51. Specifically, a date and time when predetermined maintenance work is required (hereinafter, referred to as a "maintenance date") is readout. In a case where a prior notification setting has been made, a setting of a date and time for a prior notification, that is, how many days before the maintenance date a prior notification is given (hereinafter, referred to as a "prior notification date and time") is read out.

The determination execution unit 46 compares a current date and time acquired from the clock 44 incorporated in the management server MS with the set maintenance date, and determines whether the current date and time is past the maintenance date. In the case where a prior notification setting has been made according to the maintenance settings described above, the determination execution unit 46 compares a current date and time with a prior notification date and time, and determines whether the current date and time is past the prior notification date and time.

The operation execution unit 47 executes a set operation based on the maintenance settings stored in the database 51 upon request from the remote terminal RC. Detailed operation will be described below.

(Workflow of Communication Management by Communication Management System 10)

Figure 5:
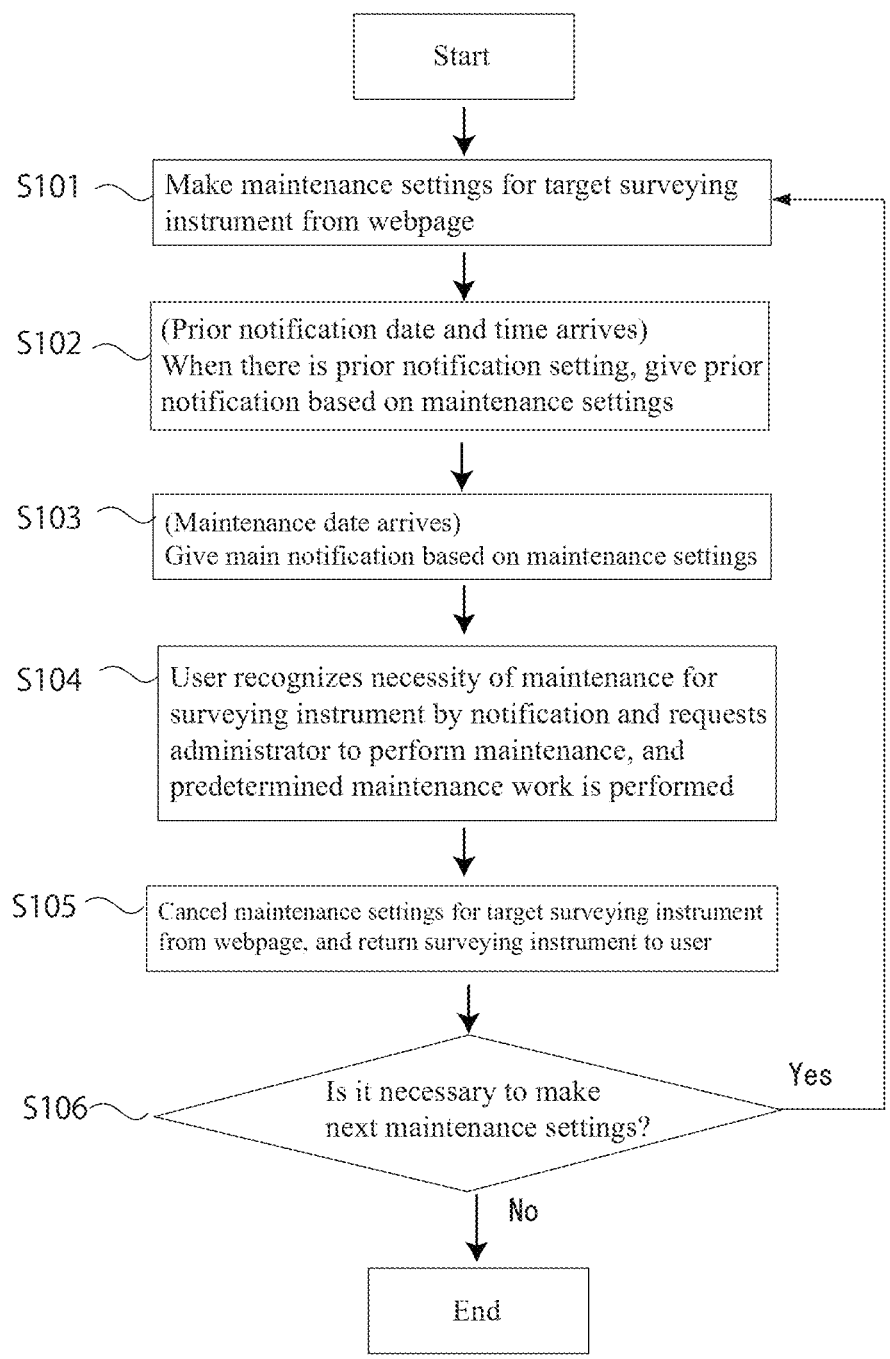
FIG. 5 is a flowchart illustrating a workflow of the communication management system according to the same embodiment.

FIG. 5 is a flowchart illustrating a workflow of communication management of the surveying instrument TSx by using the communication management system 10 according to the present embodiment.

In Step S101, the administrator opens a webpage 50 from the remote terminal RC, and makes maintenance settings for the surveying instrument TSx as a management target.

The maintenance settings include settings associated with a maintenance period. Specifically, the maintenance settings include a setting of a maintenance date, a setting as to whether to give a prior notification before a notification of arrival of the maintenance date (hereinafter, referred to as a "main notification"), and a setting of a prior notification date and time. The maintenance date can be determined based on a maintenance schedule determined by the manufacturer, and a model and a state, etc., of the surveying instrument.

The maintenance settings further include a setting of a notification means, a setting of a person to be notified, and a setting of the content of a message, etc. Here, the notification means is, for example, transmission of an e-mail, display on the display unit 24 of the surveying instrument TS, and display on the webpage 50. It is also possible that, as a person to be notified, in the case of an e-mail or display on the webpage, at least one of an administrator and a user of the surveying instrument may be selected. Content of the main notification and content of the prior notification may be the same or different from each other.

The maintenance settings may include a setting to lock the functions of the surveying instrument TSx simultaneously with the above-described notification.

In the maintenance settings described above, in the case where there is a prior notification setting, when a prior notification date and time arrives, the process shifts to Step S102, and the management server MS gives a prior notification based on the maintenance settings described above.

The prior notification may be implemented as appropriate according to the model and characteristics of the surveying instrument TSx so that the prior notification is given only once, or once every day until the maintenance date arrives, etc. When there is no prior notification setting, Step S102 is skipped.

Next, when the maintenance date arrives, the process shifts to Step S103, and the management server MS gives the main notification to at least one of the administrator and the owner of the surveying instrument as a management target based on the maintenance settings described above. The main notification can also be implemented as appropriate so as to be given once every day, given every time a power supply of the surveying instrument is turned on, or given once a week, etc. However, the main notification is continuously given until the maintenance settings are canceled, and when the maintenance settings are canceled, the notification is stopped.

In Step S104, according to the notifications in Steps S102 and S103, a user recognizes that the target surveying instrument TSx requires maintenance, and requests the administrator to perform maintenance work. Then, predetermined maintenance work is performed for the surveying instrument TSx.

When the predetermined maintenance work is completed, the process shifts to Step S105, and the webpage 50 is opened from the remote terminal RC, and by setting "Complete" as a maintenance state of the target surveying instrument TSx, the maintenance settings are canceled. The surveying instrument TSx is returned to the user.

Next, the process shifts to Step S106, and the administrator determines whether it is necessary to make the next maintenance settings. When it is necessary, the process returns to Step S101, and maintenance settings are made again from the remote terminal RC, and when it is unnecessary to make the next maintenance settings, the process is ended.

(Maintenance Settings)

Figure 6:
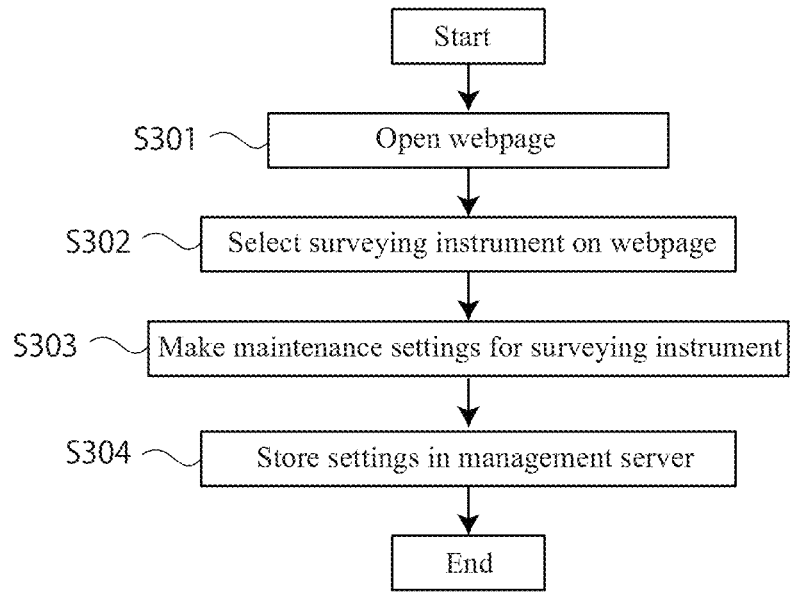
FIG. 6 is a flowchart of making maintenance settings in the communication management system according to the same embodiment.

FIG. 6 is a flowchart of making maintenance settings in the remote terminal RC in Step S101. First, in Step S301, the administrator of the surveying instrument TS logs in to the exclusive webpage 50 (FIG. 1) provided by the surveying instrument manufacturer from the remote terminal RC.

Next, when the process shifts to Step S302, a list of a plurality of registered surveying instruments TS1, TS2 . . . is displayed on the terminal display unit 33. The administrator selects a surveying instrument TSx as a setting target.

Next, when the process shifts to Step S303, a maintenance setting screen is displayed on the webpage 50 on the terminal display unit 33.

Figure 7:
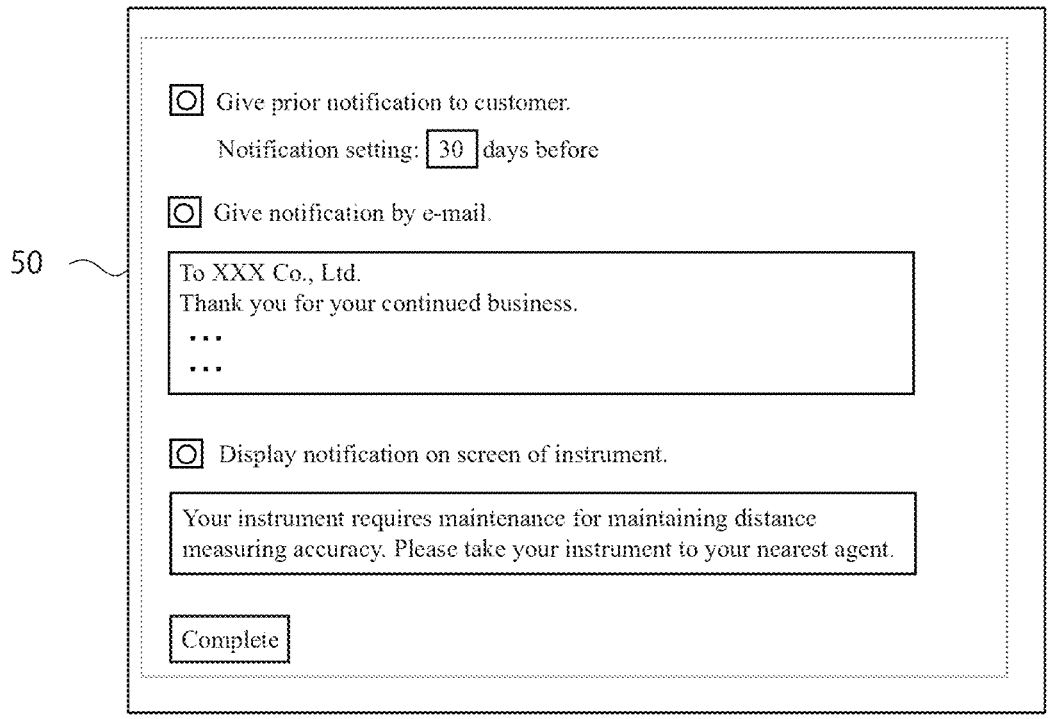
FIG. 7 is a diagram illustrating an example of a webpage for making maintenance settings in the communication management system according to the same embodiment.

FIG. 7 illustrates an example of a maintenance setting screen (webpage 50). In FIG. 7, the screen is configured so that maintenance settings can be made by using check boxes and a free input system. However, without limiting to this, the screen may be configured so that a maintenance date, necessity of a prior notification, a prior notification date and time, a notification means, a person to be notified, and notification content, etc., can be set by using means such as a pull-down menu method, check boxes, and a free input system. The administrator can set an operation according to his/her own management intentions.

Next, when the process shifts to Step S304 (FIG. 6), a setting completion permission screen is displayed on the terminal display unit 33. By selecting "YES," the settings are stored in the management server MS.

(Maintenance Setting Cancellation)

Figure 8:
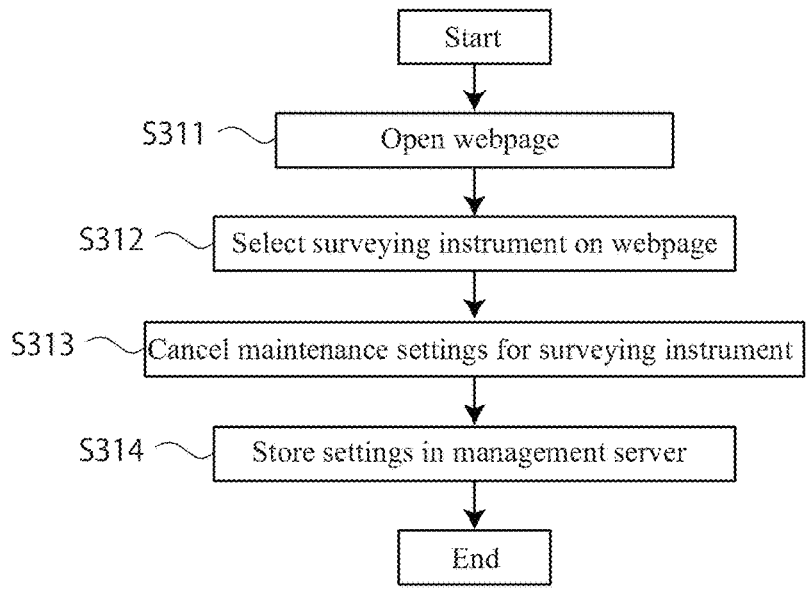
FIG. 8 is a flowchart of maintenance setting cancellation in the communication management system according to the same embodiment.

FIG. 8 is a flowchart of maintenance setting cancellation in the remote terminal RC in Step S105. First, in Step S311, the administrator of the surveying instrument TS logs in to the webpage 50 (FIG. 1) from the remote terminal RC.

Next, when the process shifts to Step S312, a list of a plurality of registered surveying instruments TS1, TS2 . . . is displayed on the terminal display unit 33. The administrator selects a surveying instrument TSx as a setting cancellation target.

Next, when the process shifts to Step S313, a maintenance cancellation setting screen is displayed on the webpage 50. Upon confirming that the maintenance of the target surveying instrument has been completed, the administrator sets "Complete" as a maintenance state, and accordingly, the maintenance settings are canceled.

Next, when the process shifts to Step S314, on the terminal display unit 33, a setting completion permission screen is displayed. By selecting "YES," a maintenance record and a cancellation setting are stored in the management server MS.

(Operation of Management Server)

Figure 9:
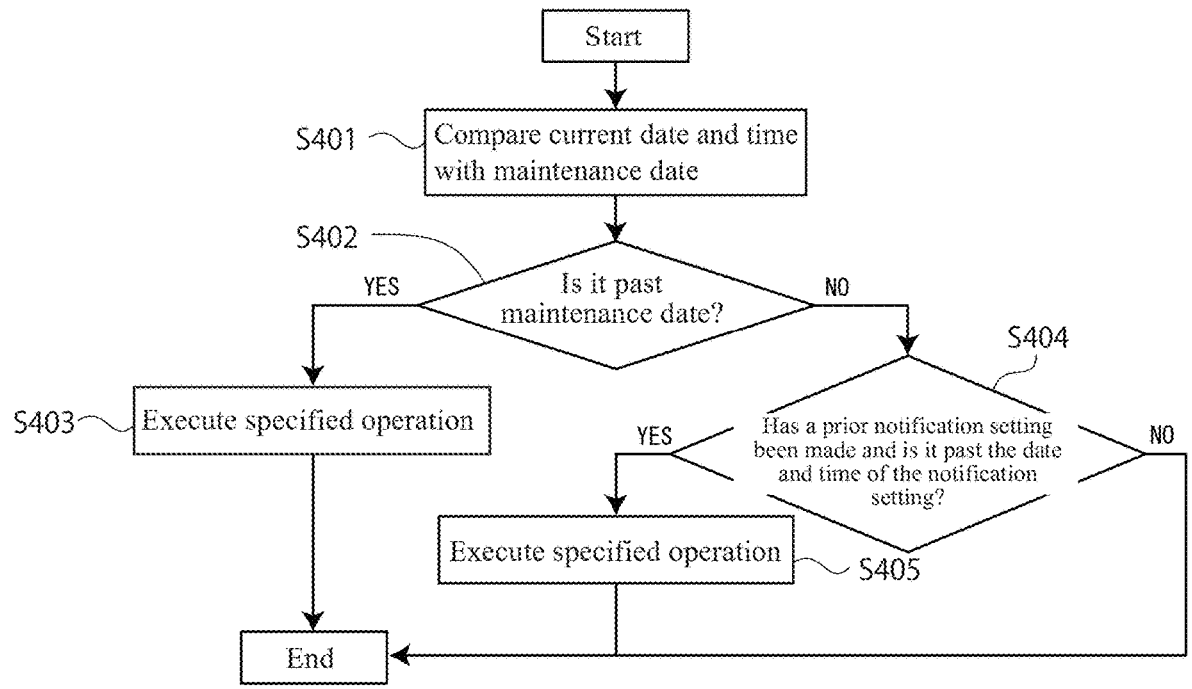
FIG. 9 is a flowchart illustrating operation of the management server according to the same embodiment.

FIG. 9 is a flowchart illustrating operation of the management server MS according to the present embodiment. The management server always performs the following operation at predetermined fixed intervals, for example, once a day. First, in Step S401, the setting readout unit 44 of the management server MS reads out a maintenance date set in the maintenance settings, and compares the maintenance date with a current date and time acquired from the clock 44.

Next, when the process shifts to Step S402, the determination execution unit 46 determines whether the current date and time is past the maintenance date. When it is past the maintenance date (Yes), the process shifts to Step S403, and an operation specified by the maintenance settings is executed. In detail, by transmission of an e-mail to a designated target person, display on a webpage of the owner or the administrator, or display on the display unit 24 of the surveying instrument TSx, a notification that the surveying instrument is in a state requiring predetermined maintenance work is provided.

Along with the operation described above, the functions of the surveying instrument TSx can be locked and the surveying instrument TSx can be put into an unusable state. Then, the management server MS ends the process.

On the other hand, when the current date and time is not past the maintenance date (No), the process shifts to Step S404, and whether a prior notification setting has been made and the current date and time is past a prior notification date and time is determined.

Here, when a prior notification setting is made and the current date and time is past the prior notification date and time (Yes), the process shifts to Step S405, and an operation specified by the maintenance settings is executed. That is, it is notified that the maintenance date has approached. Then, the management server MS completes the process.

On the other hand, when a prior notification setting is not made, and when it is not past the prior notification date and time (No) although a prior notification setting has been made, the management server MS ends the process.

(Operation of Surveying Instrument)

Figure 10:
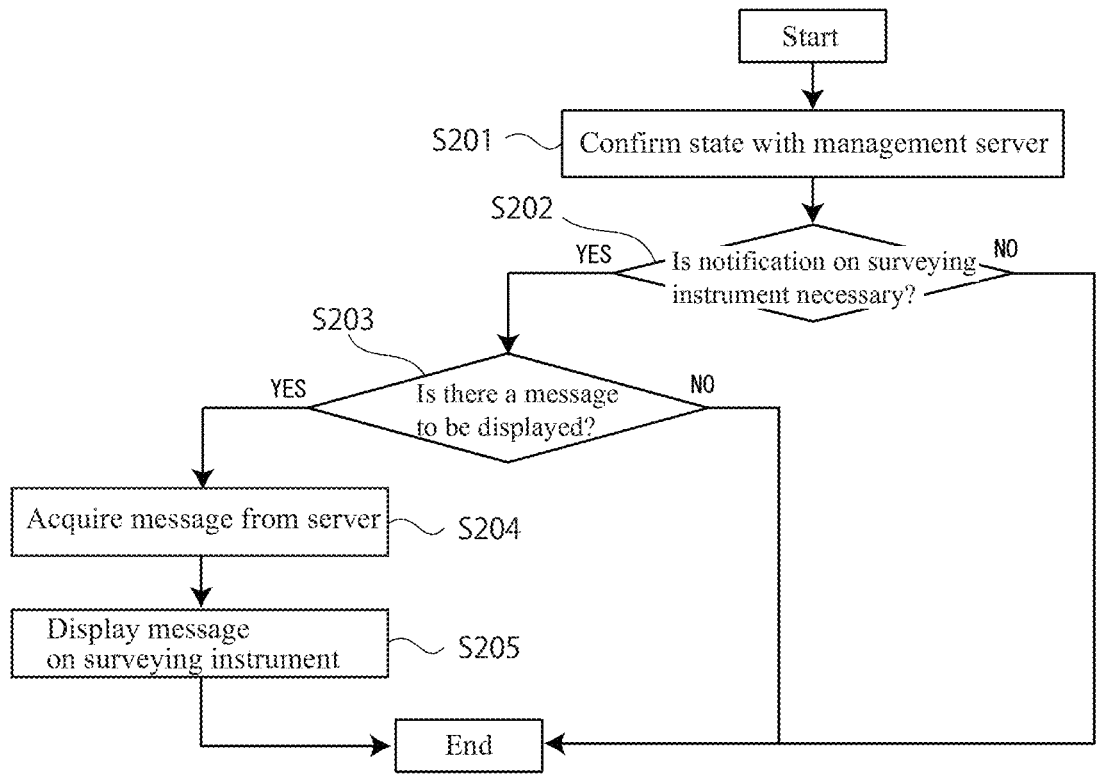
FIG. 10 is a flowchart illustrating operation of the surveying instrument according to the same embodiment.

FIG. 10 is a flowchart of operation of the surveying instrument TSx according to the present embodiment. The surveying instrument TSx communicates with the management server MS at a constant cycle and executes the following operation.

First, in Step S201, the surveying instrument confirms the state with the management server MS. Then, the process shifts to Step S202, and the surveying instrument determines whether notification on the surveying instrument TSx is necessary.

When notification on the surveying instrument TSx is necessary (Yes), the process shifts to Step S203, and the surveying instrument determines whether there is a message to be displayed.

Figure 11:
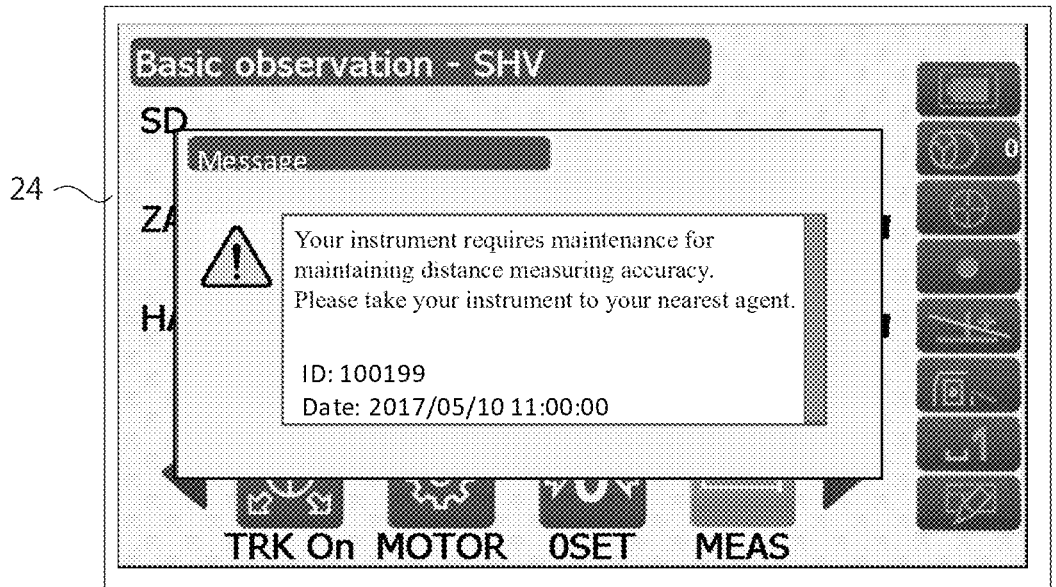
FIG. 11 is a diagram illustrating an example of a message to be displayed on the surveying instrument according to the same embodiment.

When there is a message to be displayed (Yes), the process shifts to Step S204, and the surveying instrument downloads and acquires the message from the management server MS. Next, the process shifts to Step S205, and the message is displayed on the display unit 24. FIG. 11 illustrates an example of the message to be displayed. Then, the surveying instrument TSx completes the process.

On the other hand, when there is no message to be displayed (No), the surveying instrument TSx completes the process.

In Step S202, when notification on the surveying instrument TSx is not necessary (No), the surveying instrument TSx completes the process.

(Usage Example of Communication Management System of Present Embodiment)

An example is shown in which the agent (administrator) performs maintenance management by using this system so as to prevent a user from forgetting maintenance and inspection of the surveying instrument TSx.

(1) The administrator logs in to the webpage 50 from the remote terminal RC, selects a surveying instrument TSx as a management target, makes maintenance settings, stores the maintenance settings, and closes the webpage 50. [Setting Example]

Maintenance date: Dec. 15, 2017

Prior notification: necessary (prior notification set date and time: 30 days before)

Notification method: e-mail transmission to administrator and user, display on display unit of surveying instrument Content of e-mail text and message to be displayed: arbitrarily set (2) Once a day, the management server MS reads out the stored maintenance settings, compares a current date and time with the maintenance date and the prior notification set date and time, and determines whether the current date and time is past each set date and time. The surveying instrument TSx confirms the state of the server once a day.

(3) When Nov. 15, 2017 as the prior notification date and time arrives, based on the maintenance settings in (1), the management server MS transmits a prior notification by e-mail and displays it on the display unit 24 of the surveying instrument TSx. A user is expected to confirm the message and e-mail displayed on the surveying instrument TSx, recognize that the predetermined maintenance work is required, and request the administrator to perform maintenance for the surveying instrument TSx.

(4) However, when the predetermined maintenance work is not performed even after Dec. 15, 2017 as the maintenance date arrives, and the maintenance settings are not canceled, the management server MS transmits the main notification by e-mail and displays it on the display unit 24 of the surveying instrument TSx based on the maintenance settings in (1). The main notification is given every day until the user takes the surveying instrument to the administrator or the administrator goes to the user and performs the predetermined maintenance work for the surveying instrument, and the maintenance settings are canceled by the administrator. Therefore, the user strongly recognizes that maintenance is required, and requests the administrator to perform maintenance.

(5) The administrator performs the predetermined maintenance work for the surveying instrument TSx. After completion of the work, the administrator logs in to the webpage 50 from the remote terminal RC, selects a surveying instrument TSx as a management target, cancels the maintenance settings, stores the setting, and closes the webpage 50. When the maintenance settings are canceled, the message in the management server MS is cleared, and thereafter, the notification by e-mail transmission and display on the surveying instrument TSx is stopped.

As described above, with the communication management system 10 of a surveying instrument according to the present embodiment, a user/administrator is notified that the surveying instrument TS is in a state requiring predetermined maintenance work, and the notification is not stopped unless the predetermined maintenance work is actually completed and the administrator cancels the maintenance settings, and therefore, the user/administrator cannot ignore the notification, and strongly recognizes that the surveying instrument TS is in a state requiring the predetermined maintenance work. Therefore, execution of the maintenance work can be promoted. As a result, the surveying instrument TS can be prevented from being used without maintenance.

With the communication management system 10 of a surveying instrument according to the present embodiment, maintenance settings include settings associated with a maintenance period, so that a setting can be made so that a notification that the surveying instrument is in a state requiring predetermined maintenance work is given according to a maintenance schedule determined by a manufacturer and the maintenance period determined based on a model and state, etc., of the surveying instrument TS. As a result, the maintenance schedule of the surveying instrument TS can be properly managed.

With the communication management system 10 of a surveying instrument according to the present embodiment, a prior notification is given before a maintenance date arrives, so that execution of maintenance work before the maintenance date arrives can be promoted.

In the management server MS, maintenance records of the surveying instrument TS are stored, so that each of a user, an administrator, and a manufacturer can grasp a maintenance status of the surveying instrument TS. As a result, the number of surveying instruments TS that are used without maintenance can be reduced, and the surveying instruments TS can be kept in good states.

In the communication management system 10 of a surveying instrument according to the present embodiment, putting the surveying instrument into an unusable state unless maintenance settings are canceled more reliably leads to a request for maintenance.

Second Embodiment (Entire Configuration of Communication Management System 100)

Figure 12:
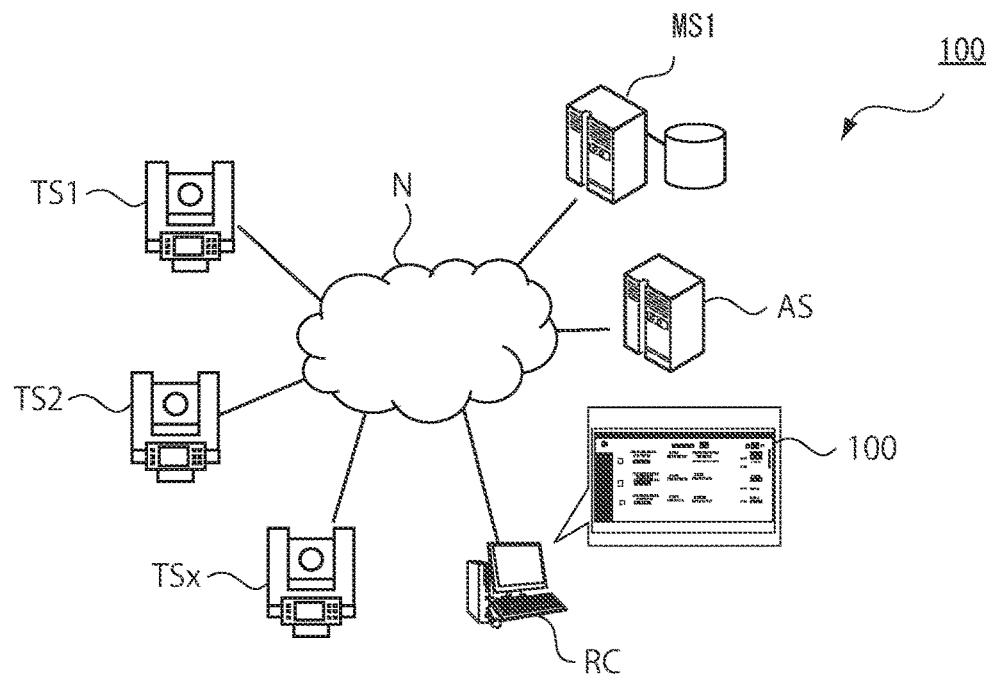
FIG. 12 is a view illustrating an entire configuration of a communication management system according to a second embodiment of the present invention.

FIG. 12 is a view illustrating an entire configuration of a communication management system 100 according to a second embodiment of the present invention. As illustrated in FIG. 12, in the communication management system 100, a billing system AS is connected to the communication network N in addition to the communication management system 10 according to the first embodiment. The same components as in the first embodiment are provided with the same reference signs, and detailed descriptions of these are omitted.

(Configuration of Management Server)

Figure 13:
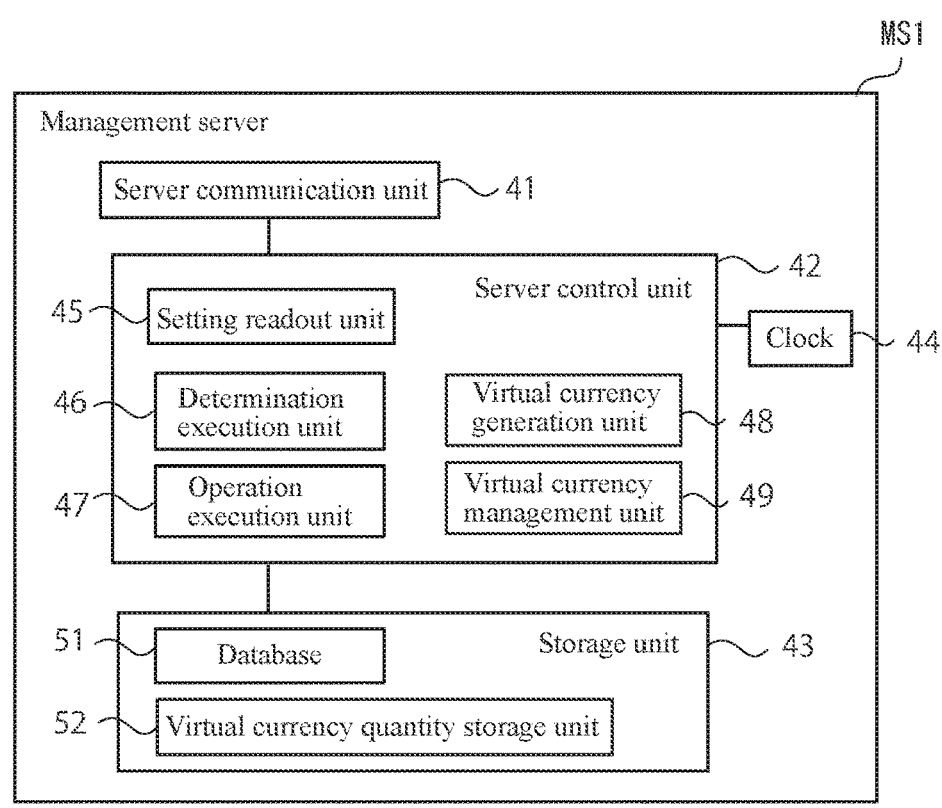
FIG. 13 is a configuration block diagram illustrating a configuration of a management server according to the same embodiment.

FIG. 13 is a configuration block diagram of a management server MS1 according to the present embodiment. The management server MS1 includes, in addition to the configuration of the management server MS according to the first embodiment, at least a virtual currency generation unit 48 and a virtual currency management unit 49 in the server control unit 42, and a virtual currency quantity storage unit 52 in the storage unit 43.

Virtual currency has monetary value enabling economic activities related to services provided by the communication management system 100, and may be converted into cash or have exchange value to be used for other services. The administrator can purchase this virtual currency by, for example, automatic withdrawal from a bank account, payment by credit card, or using electronic money purchased in advance and available on the Web.

Upon request from the remote terminal RC, the virtual currency generation unit 48 generates virtual currency in a form of exchange of currency such as yen or dollar, and creates billing data corresponding to the quantity of virtual currency. Here, the virtual currency has monetary value enabling economic activities related to services provided by the communication management system 100, and may be converted into cash or have exchange value to be used for other services. The administrator can purchase this virtual currency by, for example, automatic withdrawal from a bank account, payment by credit card, or using electronic money purchased in advance and available on the Web.

The billing data is data necessary for payment, and includes, for example, a bank account number or a credit card number, and a purchased amount, etc.

The billing system AS makes payment based on billing data corresponding to the quantity of virtual currency transmitted from the management server MS. This billing system AS is realized by a computer, and is a publicly known technique, so that detailed description of this is omitted. The billing system AS may be incorporated in the management server MS.

The virtual currency purchased by the administrator, etc., is stored in the database 51 in association with an account of the administrator, etc., or a management number of the surveying instrument TSx. The virtual currency management unit 49 manages the quantity of virtual currency stored in the database 51.

The virtual currency quantity storage unit 52 stores a quantity of virtual currency that is generated in the virtual currency generation unit 48 described below and managed by the virtual currency management unit 49.

(Workflow of Communication Management by Communication Management System 100)

Figure 14:
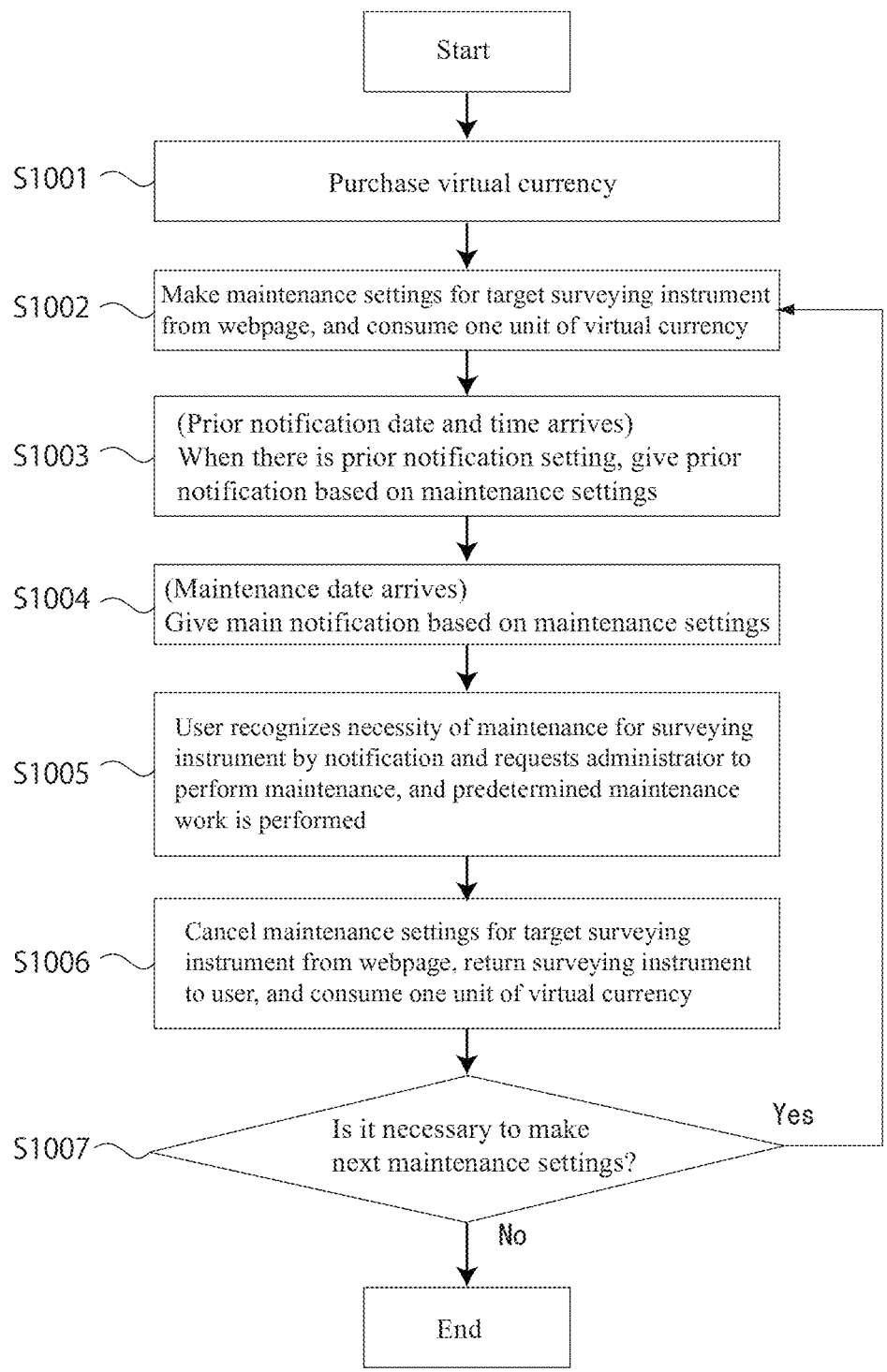
FIG. 14 is a flowchart illustrating a workflow of the communication management system according to the same embodiment.

FIG. 14 is a flowchart illustrating a workflow of communication management of the surveying instrument TSx by using the communication management system 100 according to the present embodiment.

In Step S1001, through the remote terminal RC, the administrator purchases in advance virtual currency from a webpage.

Next, in Step S1002, the administrator opens a webpage from the remote terminal RC, and makes the same maintenance settings as in the first embodiment for a surveying instrument TSx as a management target.

A setting completion permission screen displays that consumption of one unit of virtual currency is necessary to complete setting. By selecting "YES," the settings are stored in the management server MS1, and one unit of virtual currency purchased in advance is consumed, and a reduced quantity of virtual currency is stored in the management server MS1. The quantity of virtual currency to be consumed can be arbitrarily set by the manufacturer.

In the above-described maintenance settings, in the case where there is a prior notification setting, when a prior notification date and time arrives, the process shifts to Step S1003, and the management server MS provides a prior notification based on the maintenance settings described above. When there is no prior notification setting, Step S1003 is skipped.

Next, when a maintenance date arrives, the process shifts to Step S1004, and the management server MS1 gives the main notification to at least one of the administrator and the owner of the surveying instrument as a management target based on the maintenance settings described above. The main notification is continuously given until the maintenance settings are canceled, and when the maintenance settings are canceled, the notification is stopped.

In Step S1005, a user who recognizes the necessity of maintenance based on the notifications in Steps S1003 and S1004 requests the administrator to perform maintenance work for the surveying instrument TSx. Then, predetermined maintenance work is performed for the surveying instrument TSx.

When the predetermined maintenance work is completed, the process shifts to Step S1006, and from the remote terminal RC, the webpage 50 is opened, and by setting "Complete" as a maintenance state of the target surveying instrument TSx, the maintenance settings are canceled.

A setting cancellation permission screen displays that consumption of one unit of virtual currency is necessary to store the cancellation setting. By selecting "YES," cancellation of the maintenance settings is stored in the management server MS1 and one unit of virtual currency is consumed, and a reduced quantity of virtual currency is stored in the management server MS1. The quantity of virtual currency to be consumed can be arbitrarily set by the manufacturer. Then, the surveying instrument TSx is returned to the user.

Next, when the process shifts to Step S1007, the administrator determines whether it is necessary to make next maintenance settings. When it is necessary, the process returns to Step S1001, and maintenance settings are made again, and when it is unnecessary, the process is ended.

Here, consumption of virtual currency may be performed in both Steps S1002 and S1006, however, without limiting to this, the consumption may be performed in either one step upon request from the market, etc.

In the communication management system 100 according to the present embodiment, the surveying instrument manufacturer providing the communication management system 100 provides a notification function according to maintenance settings as a fee-based service to the administrator. This notification function can significantly urge a user to request the administrator to perform maintenance work. On the other hand, a simple and secure payment system using virtual currency is used, so that the administrator does not have to perform troublesome procedures for payment. Therefore, use of this notification function by the administrator is strongly promoted.

Although preferred embodiments of the present invention are described above, the above-described embodiments are just examples of the present invention, and these can be combined based on knowledge of a person skilled in the art, and such a combined embodiment is also included in the scope of the present invention.

REFERENCE SIGNS LIST

10 Communication management system for surveying instrument
21 Survey unit
22 Control unit
23 Communication unit
100 Communication management system of surveying instrument
N Communication network
MS Management server
MS1 Management server
RC Remote terminal
TS Surveying instrument

The invention claimed is:

1. A communication management system for a surveying instrument, comprising:
   a surveying instrument including a survey unit configured to survey a target, a control unit configured to control the survey unit, and a communication unit connected to a communication network;
   a management server capable of communicating with the surveying instrument through the communication network; and
   a remote terminal capable of communicating with the management server through the communication network, wherein
   the remote terminal is configured to make maintenance settings for the surveying instrument and cancel the maintenance settings, and store the maintenance settings and cancellation of the settings in the management server,
   the management server is configured to give a notification to at least one of a user and an administrator of the surveying instrument that the surveying instrument is in a state requiring predetermined maintenance work according to the maintenance settings, and when the maintenance settings are canceled, stop the notification,
   the maintenance settings include settings associated with a maintenance period, and
   the notification includes a prior notification to be given before a maintenance date arrives.

2. The communication management system according to claim 1, wherein the management server is configured to set the surveying instrument into an unusable state until the maintenance settings are canceled.

3. The communication management system according to claim 1, wherein, in order to perform at least one of making maintenance settings for the surveying instrument and cancellation of the maintenance settings, one unit of virtual currency generated in advance for payment related to communication management of the surveying instrument is consumed.

4. The communication management system according to claim 2, wherein, in order to perform at least one of making maintenance settings for the surveying instrument and cancellation of the maintenance settings, one unit of virtual currency generated in advance for payment related to communication management of the surveying instrument is consumed.

* * * * *